(12) United States Patent
Tanibe

(10) Patent No.: US 11,842,112 B2
(45) Date of Patent: Dec. 12, 2023

(54) SYSTEM AND CONTROL METHOD

(71) Applicant: CANON KABUSHIKI KAISHA, Tokyo (JP)

(72) Inventor: Ryuya Tanibe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/716,867

(22) Filed: Apr. 8, 2022

(65) Prior Publication Data
US 2022/0326898 A1    Oct. 13, 2022

(30) Foreign Application Priority Data
Apr. 13, 2021 (JP) ................... 2021-067956

(51) Int. Cl.
*G06F 3/12* (2006.01)

(52) U.S. Cl.
CPC .......... *G06F 3/1267* (2013.01); *G06F 3/1204* (2013.01); *G06F 3/1222* (2013.01); *G06F 3/1292* (2013.01)

(58) Field of Classification Search
None
See application file for complete search history.

(56) References Cited

U.S. PATENT DOCUMENTS

| | | | |
|---|---|---|---|
| 2011/0286026 A1 | 11/2011 | Matsuzawa | |
| 2013/0044343 A1* | 2/2013 | Matsugashita | G06F 3/1222 358/1.14 |
| 2019/0243584 A1* | 8/2019 | Yashiro | G06F 3/1288 |

FOREIGN PATENT DOCUMENTS

JP     2019164594 A     9/2019

\* cited by examiner

*Primary Examiner* — Frantz Bataille
(74) *Attorney, Agent, or Firm* — Canon U.S.A., Inc. IP Division

(57) ABSTRACT

A system includes a first print service connected to a client terminal, a second print service connected to an image forming apparatus, and a third print service. The first print service receives a print job from the client terminal and transmits the received print job to the third print service by using first authorization information for accessing the third print service. The second printing service receives identification information for identifying the print job from the image forming apparatus, acquires the print job identified by the identification information from the third print service by using the second authorization information for accessing the third print service, and transmits the acquired print job to the image forming apparatus.

6 Claims, 11 Drawing Sheets

SYSTEM AND CONTROL METHOD

BACKGROUND

Field of the Disclosure

The present disclosure relates to a system including a plurality of print services and a control method for the system.

Description of the Related Art

In recent years, a cloud print service, in which a print job is input to an image forming apparatus via the cloud, has begun to spread. In a printing system using such a cloud print service, the image forming apparatus is registered with a tenant corresponding to the cloud print service, and a user belonging to the tenant is set to be permitted to use the image forming apparatus. In the present disclosure, the tenant corresponds to a service system that a user deploys on the cloud, and has a storage area whose access is restricted to the user. For example, in a tenant of a company A of a cloud print service used by the company A, an employee working for the company A is registered as a user, and the image forming apparatus under the control of the company A is registered and used by the employee. Thus, the user of the company A can instruct the image forming apparatus under the control of the company A from the client terminal in the company to print a print job.

In addition, there is a system in which a plurality of services cooperate. Japanese Patent Application Laid-Open No. 2019-164594 describes that a system including a plurality of servers provides services via a network 300. In Japanese Patent Application Laid-Open No. 2019-164594, the image processing apparatus connects to the server via a relay server by using a connection authority processing execution account and a data management account prepared for each server.

SUMMARY

Embodiments of the present disclosure provide a mechanism for enabling cooperation among a plurality of print services by allowing the plurality of print services to access one print service.

According to embodiments of the present disclosure, a system includes a first print service connected to a client terminal via a network, a second print service connected to an image forming apparatus via the network, and a third print service communicable with the first print service and the second print service, the first print service comprising first one or more memories storing first instructions and first one or more processors that execute the first instructions to: store first authorization information for accessing the third print service in the first one or more memories; receive a print job from the client terminal; and transmit the received print job with the stored first authorization information to the third print service, the second print service comprising second one or more memories storing second instructions and second one or more processors that execute the second instructions to: store second authorization information for accessing the third print service in the second one or more memories; receive identification information for identifying the print job from the image forming apparatus; acquire the print job identified by the identification information with the stored second authorization information from the third print service; and transmit the acquired print job to the image forming apparatus, the third print service comprising third one or more memories storing third instructions and third one or more processors that execute the third instructions to: store the received print job from the first print service in the third one or more memories; and transmit the stored print job to the second print service.

Further features of the present disclosure will become apparent from the following description of exemplary embodiments with reference to the attached drawings.

DESCRIPTION OF THE EMBODIMENTS

Figure 1:
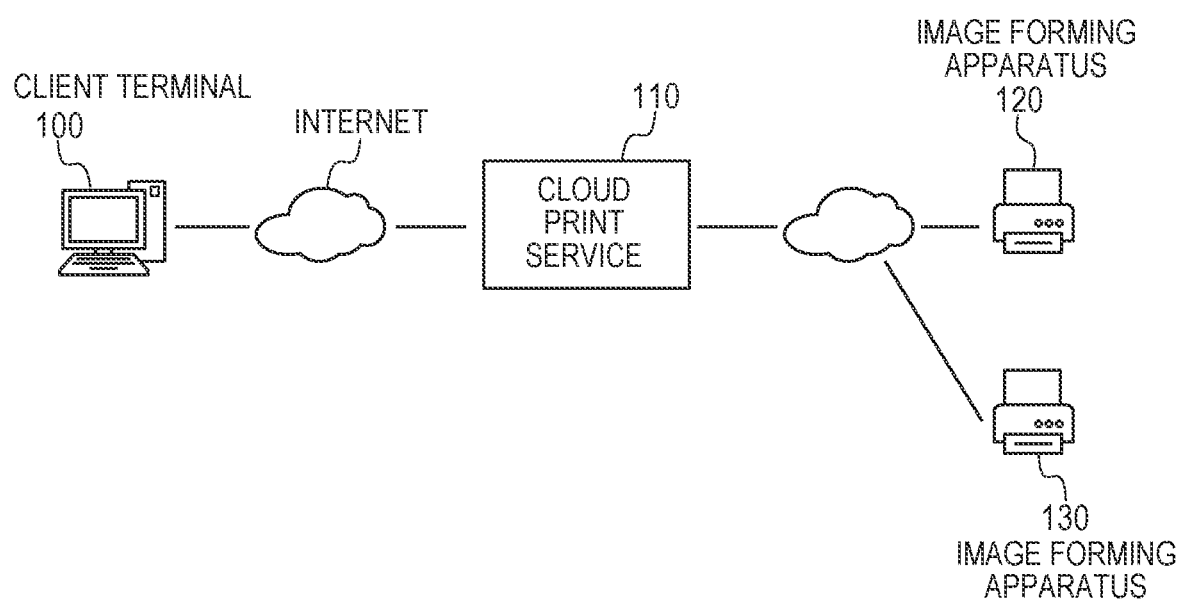
FIG. 1 illustrates an example of the basic configuration of the cloud print service system.

Embodiments of the present disclosure will now be described with reference to the drawings. It should be noted that the following embodiments are not intended to limit the disclosure, and not all of the combinations of features described in the embodiments are deemed to be essential. The same components will be described with the same reference numerals.

FIG. 1 illustrates a system configuration of a cloud print service. First, an administrator of the image forming apparatus registers an image forming apparatus 120 and an image forming apparatus 130 with the tenant of the cloud print service. Further, the administrator issues an account for the tenant to a user who actually uses the image forming apparatus, and registers a client terminal 100 with the tenant. Thus, the print job can be transmitted from the client terminal to the image forming apparatus via the cloud print service. With this configuration, since the print job transmitted from the client terminal 100 can be executed from any image forming apparatus (for example, the image forming apparatuses 120 and 130) registered with the tenant, there is an advantage that the degree of freedom of the place where the user executes printing is increased.

Figure 2:
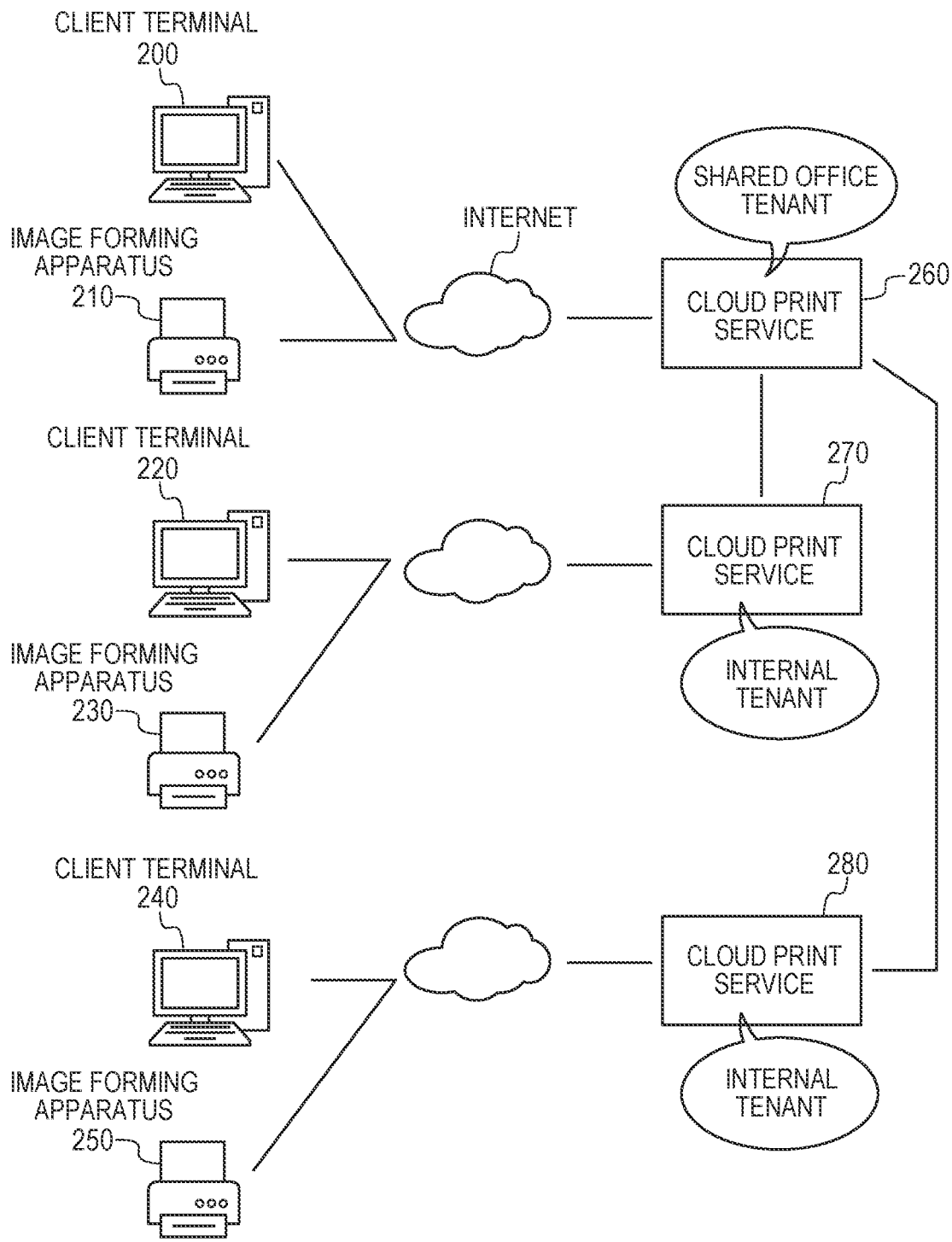
FIG. 2 illustrates an example of a basic configuration of the cloud print service cooperation system.

FIG. 2 illustrates an example of a system configuration in which a plurality of print services cooperate. This is a configuration example of a system for realizing printing of a document stored in the client terminal in a company from an image forming apparatus installed in a shared office. An image forming apparatus 210 of the shared office is registered in a cloud print service (hereinafter CPS) 260. A client terminal 220 in the company is registered in a CPS 270.

In the system configuration shown in FIG. 2, when the print job input from the client terminal 220 to the CPS 270 is executed by the image forming apparatus 210, the print job must be transmitted from the CPS 270 to the CPS 260. For this purpose, authentication and authorization processing from the CPS 270 to the CPS 260 is required. As described above, since it is necessary to perform authentication and authorization processing in each of the plurality of CPSs for transmitting and receiving data, there is an issue that the number of connection destinations increases as the number of CPSs increases.

First Embodiment

First, a first embodiment of the disclosure will be described.

[System Configuration]

FIG. 2 illustrates the system configuration in this embodiment. This is the system configuration example for realizing printing of a document stored in the client terminal in the company by the image forming apparatus installed in the shared office.

The image forming apparatus 210 in the shared office is registered in the cloud print service (hereinafter CPS) 260 corresponding to the shared office tenant. The client terminals 220 and 240 of the internal tenants are registered in CPS 270 and 280 corresponding to the internal tenants, respectively. In this configuration, it is necessary to transmit the print job input from the client terminal 220 to the shared office tenant via the internal tenant. As a method for realizing the transmission of a print job, a method using an authentication and authorization mechanism such as OAuth is considered.

In the system configuration illustrated in FIG. 2, when the user executes a print job by the image forming apparatuses 230 and 250 registered with the internal tenant, the print result log is managed by the internal tenant. Here, the print result log refers to the number of prints, printing method (monochrome/color), billing information (amount), and the like. Even when the user executes the print job by the image forming apparatus 210 registered in the shared office tenant, the print result log must be managed by the internal tenant because the company's tenants will be able to charge for printing costs and review logs of printed documents by the user.

Therefore, after the user has executed printing in the image forming apparatus 210, the print result log needs to be transmitted from the shared office tenant to the internal tenant. However, in order to transmit the secure information such as the print result log from the shared office tenant to the internal tenant, the authentication and authorization process described above is required. Company tenants are located in each company, and shared office tenants are located in each shared office. In other words, in order to execute the print job and to transmit the print result log, the process of authenticating and authorizing the shared office tenant that executes the print job in each of the company tenants, and the process of authenticating and authorizing the company tenant that executes the print job in each of the shared office tenants are performed.

Figure 5:
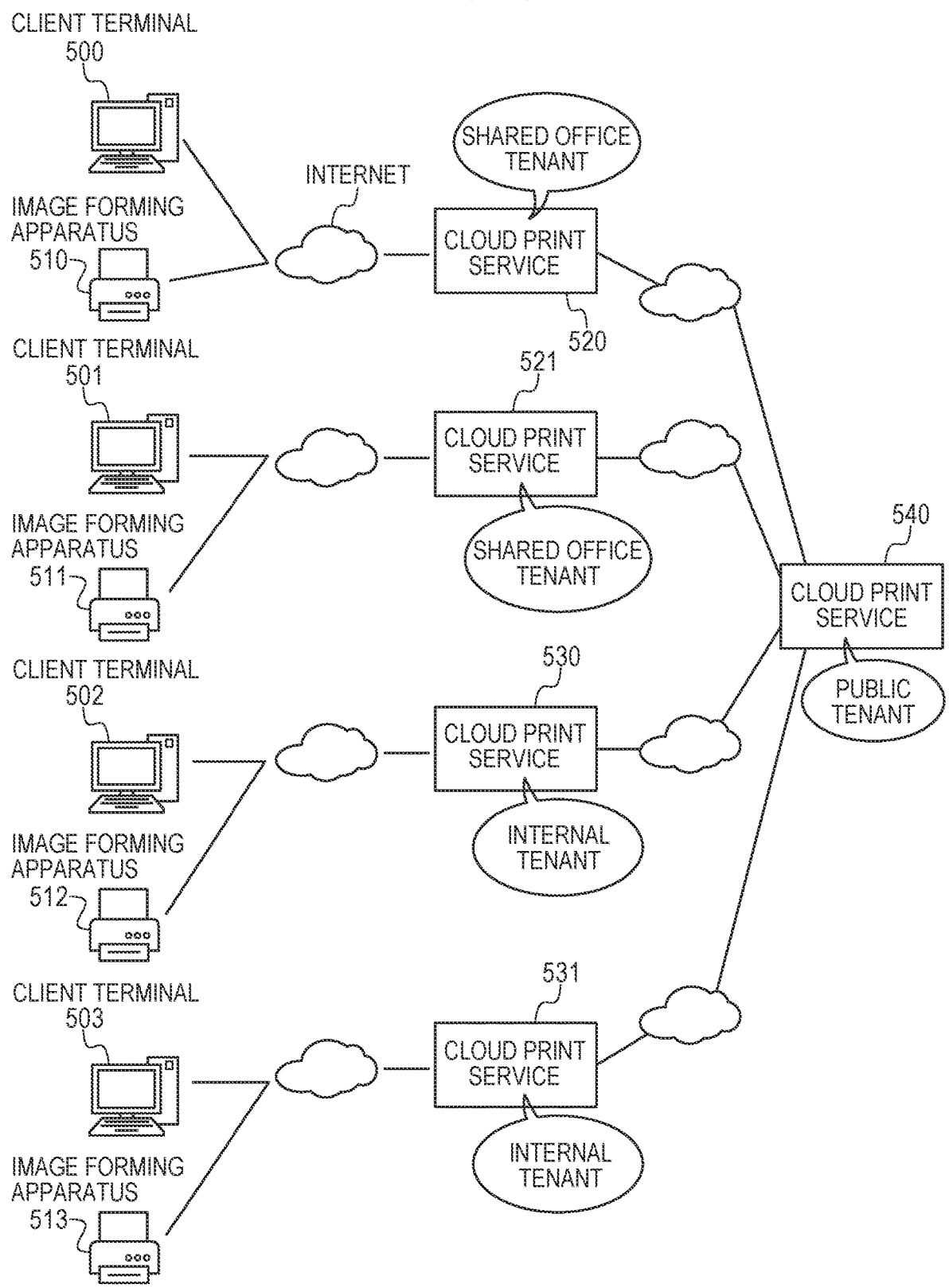
FIG. 5 illustrates an example of the overall configuration of the system in the first embodiment.

FIG. 5 illustrates the system configuration in this embodiment. In the system configuration of FIG. 2 described above, the CPSs 260, 270, and 280 are respectively connected to other CPSs. In contrast, in the system configuration of FIG. 5, each of CPSs 520, 521, 530, and 531 is connected to a cloud print service 540 corresponding to the public tenant. That is, transmission and reception of data between the CPSs 520, 521, 530, and 531 are performed via the CPS 540. In the system configuration illustrated in FIG. 2, the CPSs 260, 270, and 280 need to be individually connected to the CPS of the data transmission destination and reception source. On the other hand, in FIG. 5, each CPS can transmit and receive data to and from other CPSs connected to the CPS 540 by connecting to the CPS 540.

Client terminals 500, 501, 502, and 503 input a print job to each CPS. Each of image forming apparatuses 510, 511, 512, and 513 acquires a print job from each CPS and executes print processing. The CPSs 520 and 521 receive print jobs from the client terminals 500 and 501 and transmit print result logs to the CPS 540, respectively. The CPS s 530 and 531 receive a print job from the client terminals 502 and 503 and transmitting the print job to the CPS 540, respectively. The CPS 540 receives print result logs from the CPSs 520, 521 and receives print result logs from the CPSs 530, 531.

Each of the components is communicatively connected by the network. The network may be, for example, a LAN such as the Internet, a WAN, a telephone line, a dedicated digital line, an ATM, or the like. Alternatively, the communication network is realized by these combinations. The network needs to be capable of transmitting and receiving data.

The system configurations illustrated in FIGS. 2 and 5 may be combined.

That is, while each CPS connects to CPS 540, some CPSs may connect directly to other CPSs.

[Hardware Configuration]

Figure 10A:
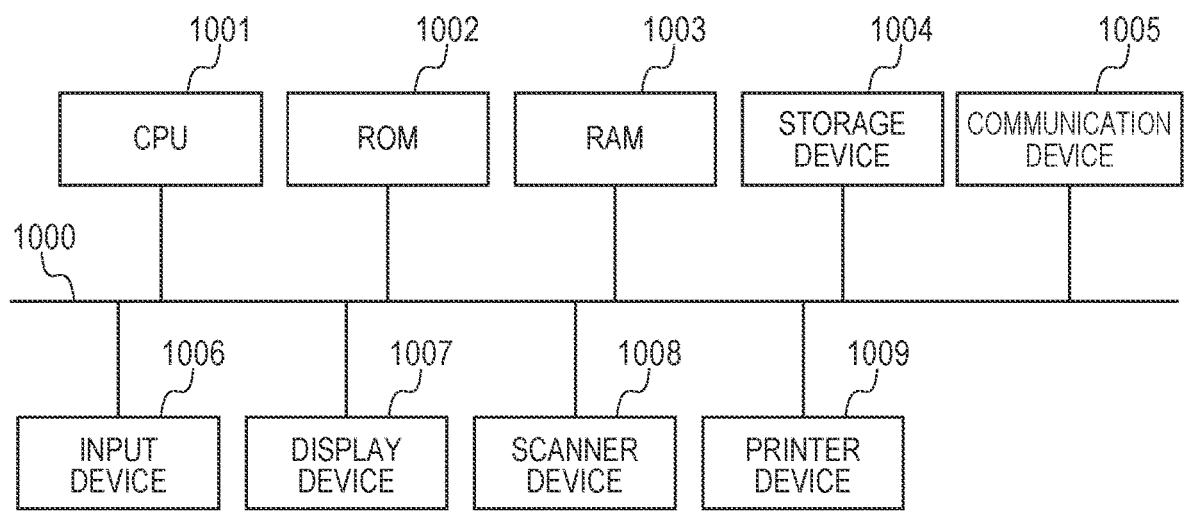
FIG. 10A illustrates an example of a block diagram of a hardware configuration of the image forming apparatus.

FIG. 10A is a block diagram illustrating an example of the hardware configuration of the image forming apparatus 510 to 513. A CPU 1001 integrally controls the entire hardware, controls each unit connected to a bus 1000, and executes each function such as printing and scanning. A ROM 1002 is a memory dedicated for reading data and stores, for example, a basic control program of the image forming apparatus. A RAM 1003 is a memory capable of reading/writing data and is used as a working memory of the CPU 1001, for example. A storage device 1004 is used as a storage area for temporary data during execution of each program and permanent data. For example, although an HDD is often used as the storage device 1004, it may be a device such as an SSD, a CD, a DVD, a memory card or the like which can be loaded with an external medium and read/write data. A communication device 1005 is connected to a LAN or the Internet, and enables data communication by TCP/IP between each device and the CPS. An input device 1006 is an operation unit for receiving input operations of characters and data by the user, for example, a keyboard, a mouse, a hard key, and a touch panel. A display device 1007 is a device for displaying various screens, such as a liquid crystal display or a touch panel. On the user interface screen displayed on the display device 1007, the user gives an instruction via the input device 1006 and gives the job execution instruction to the CPS 530.

In addition to the CPU 1001, the ROM 1002, the RAM 1003, the storage device 104, the communication device 1005, the input device 1006, and the display device 1007, a scanner device 1008 and a printer device 1009 are connected to the bus 1000.

Figure 10B:
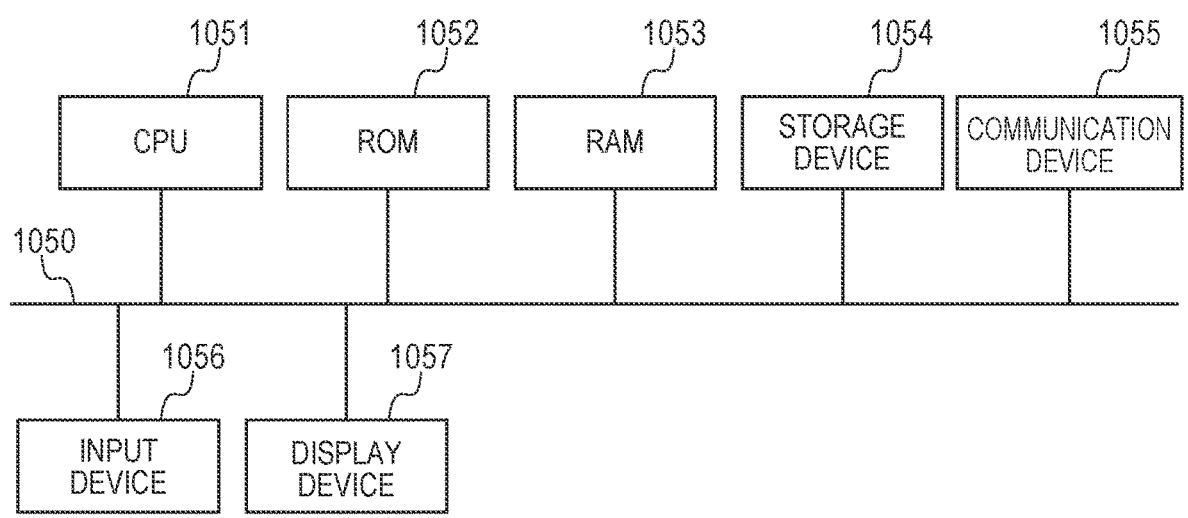
FIG. 10B illustrates an example of a block diagram of a hardware configuration of the information processing apparatus.

FIG. 10B is a block diagram illustrating an example of the hardware configuration of the information processing apparatus of this embodiment. The information processing apparatus of this embodiment includes the client terminal 500 to 503 illustrated in FIG. 5. Further, a server computer of a data center in which a cloud service functioning as each CPS is constructed is also included in the information processing apparatus of this embodiment.

A CPU 1051 integrally controls the entire hardware, controls each unit connected to a bus 1050, and executes each function such as printing and scanning. A ROM 1052 is a memory dedicated for reading data and stores, for example, a basic control program of the image forming apparatus. A RAM 1053 is a memory capable of reading/writing data and is used as a working memory of the CPU 1051, for example. A storage device 1054 is used as a storage area for temporary data during execution of each program and permanent data. For example, although an HDD is often used as the storage device 1054, it may be a device such as an SSD, a CD, a DVD, a memory card or the like which can be loaded with an external medium and read/write data. A communication device 1055 is connected to a LAN or the Internet, and enables data communication by TCP/IP between each device and the CPS. An input device 1056 is an operation unit for receiving input operations of characters and data by the user, for example, a keyboard, a mouse, a hard key, and a touch panel. A display device 1057 is a device for displaying various screens, such as a liquid crystal display or a touch panel. On the user interface screen displayed on the display device 1057, the user gives an instruction via the input device 1056 and gives the job execution instruction to the CPS 530. The server computer of the data center where the cloud service functioning as each CPS is constructed may not have the display device 1057.

[Software Configuration]

Figure 3:
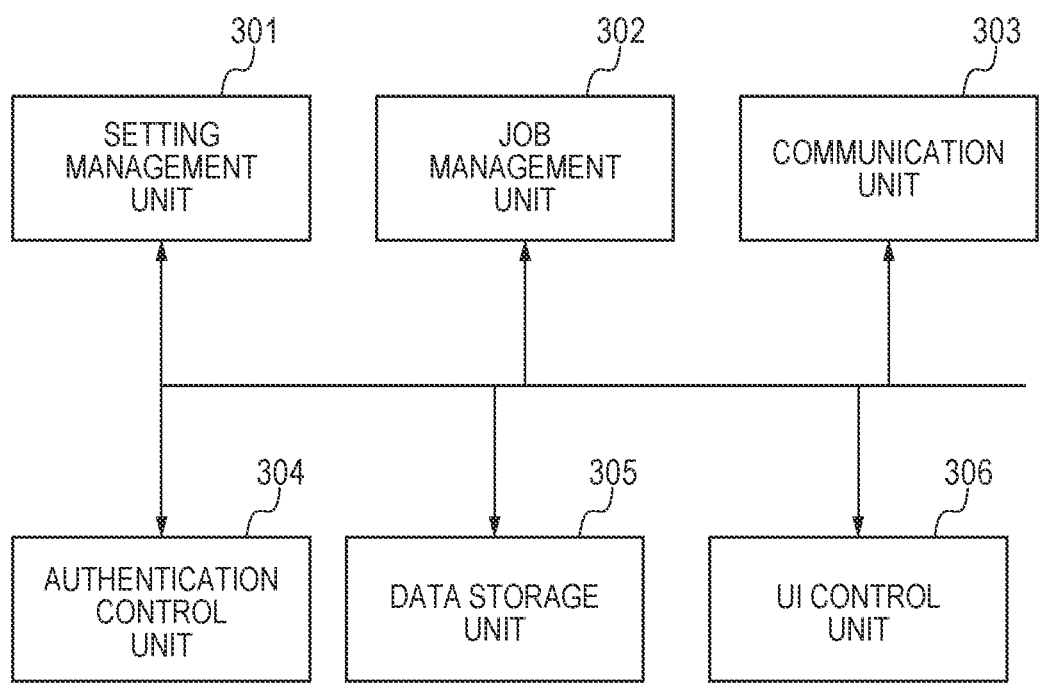
FIG. 3 illustrates an example of a block diagram of a software configuration of the cloud print service.

FIG. 3 is a block diagram illustrating an example of the software configuration of the CPS 540 according to the first embodiment. The software configuration illustrated in FIG. 3 is realized by the CPU 1001 reading a program stored in, for example, the ROM 1002 into the RAM 1003 and executing the program.

A setting management unit 301 stores settings related to various functions of the CPS 540 in each storage device such as the RAM 1003 and the storage device 1004, and reads the settings from each storage device. A job management unit 302 stores the print job received from the CPSs 530 and 531 in a data storage unit 305. When receiving the acquisition request of the print job from the CPSs 520 and 521, the print job is acquired from the CPSs 540 and transmitted to the CPSs 520 and 521.

[Authorization Sequence]

Figure 4:
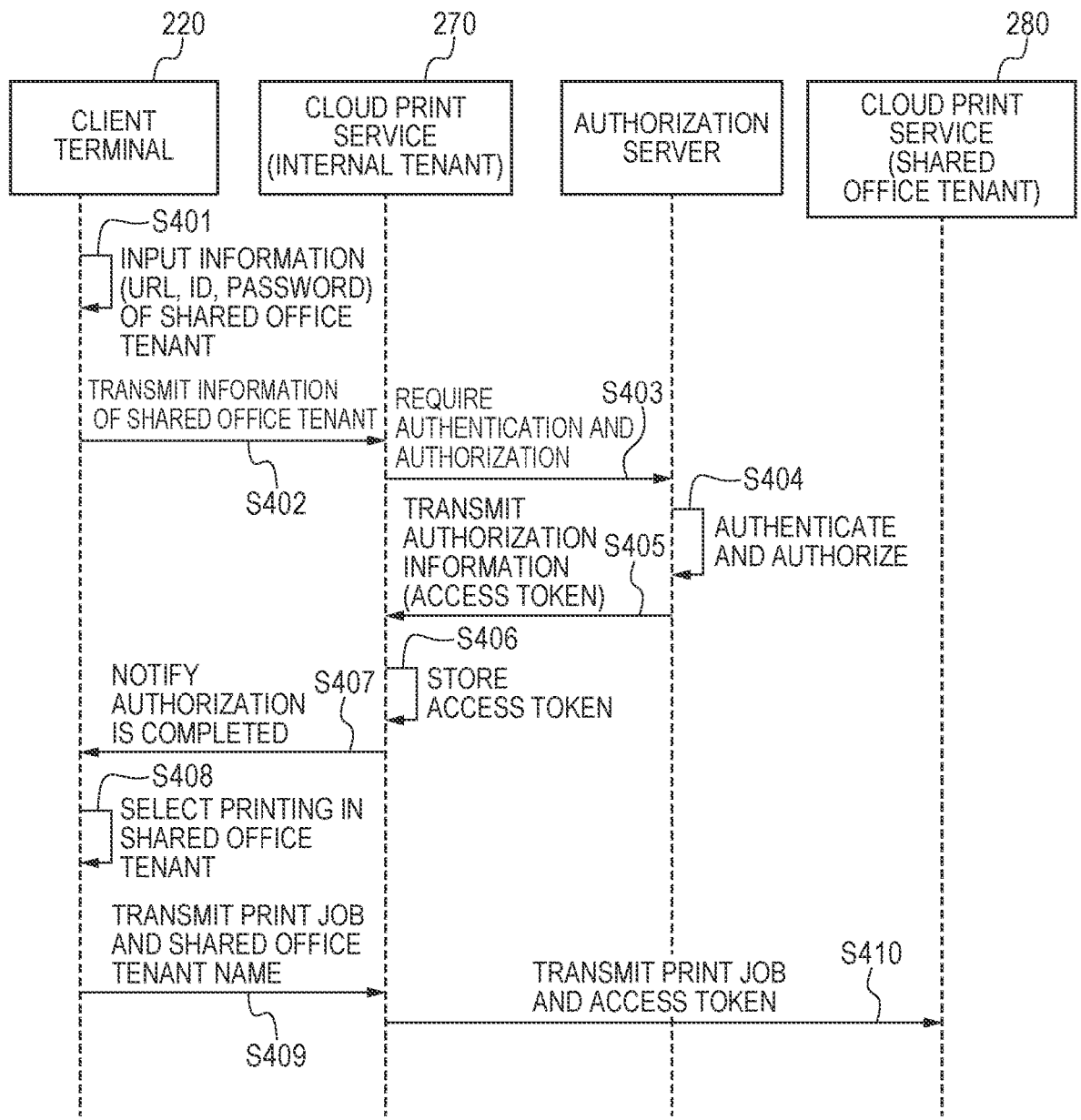
FIG. 4 illustrates an example of a sequence diagram of an authentication and authorization process from the internal tenant to the shared office tenant.

FIG. 4 illustrates a sequence of authentication and authorization processing in the system configuration of FIG. 2. More specifically, FIG. 4 illustrates a sequence for sending the print job from the internal tenant to the shared office tenant using the authentication and authorization mechanism.

First, the user inputs the information of the shared office tenant (for example, the shared office tenant's URL, ID, and Password) by the client terminals 220, 240 (S401) and transmits the information of the shared office tenant to the internal tenant (S402).

The internal tenant transmits the received information to the authorization server (S403). The authorization server performs authentication and authorization processing based on the received information (S404). If authorization is successful, the authorization server transmits authorization information (access token) to the internal tenant (S405). The internal tenant stores the received access token (S406) and notifies the client terminals 220 and 240 that the authorization is completed (S407). When the user designates the shared office tenant as the print job transmission destination in the client terminals 220 and 240 (S408), the print job and the shared office tenant name are transmitted to the internal tenant (S409). In step S408, the shared office tenants for which the processes in steps S401 to S407 have been performed are displayed in a list, and the shared office tenant in which the print job is printed is designated from the list. The internal tenant receiving the print job and the print destination tenant name transmits the print job together with the stored access token to the shared office tenant (S410). By using such the authentication and authorization mechanism, secure information called print jobs can be transmitted and received between external tenants.

Figure 6:
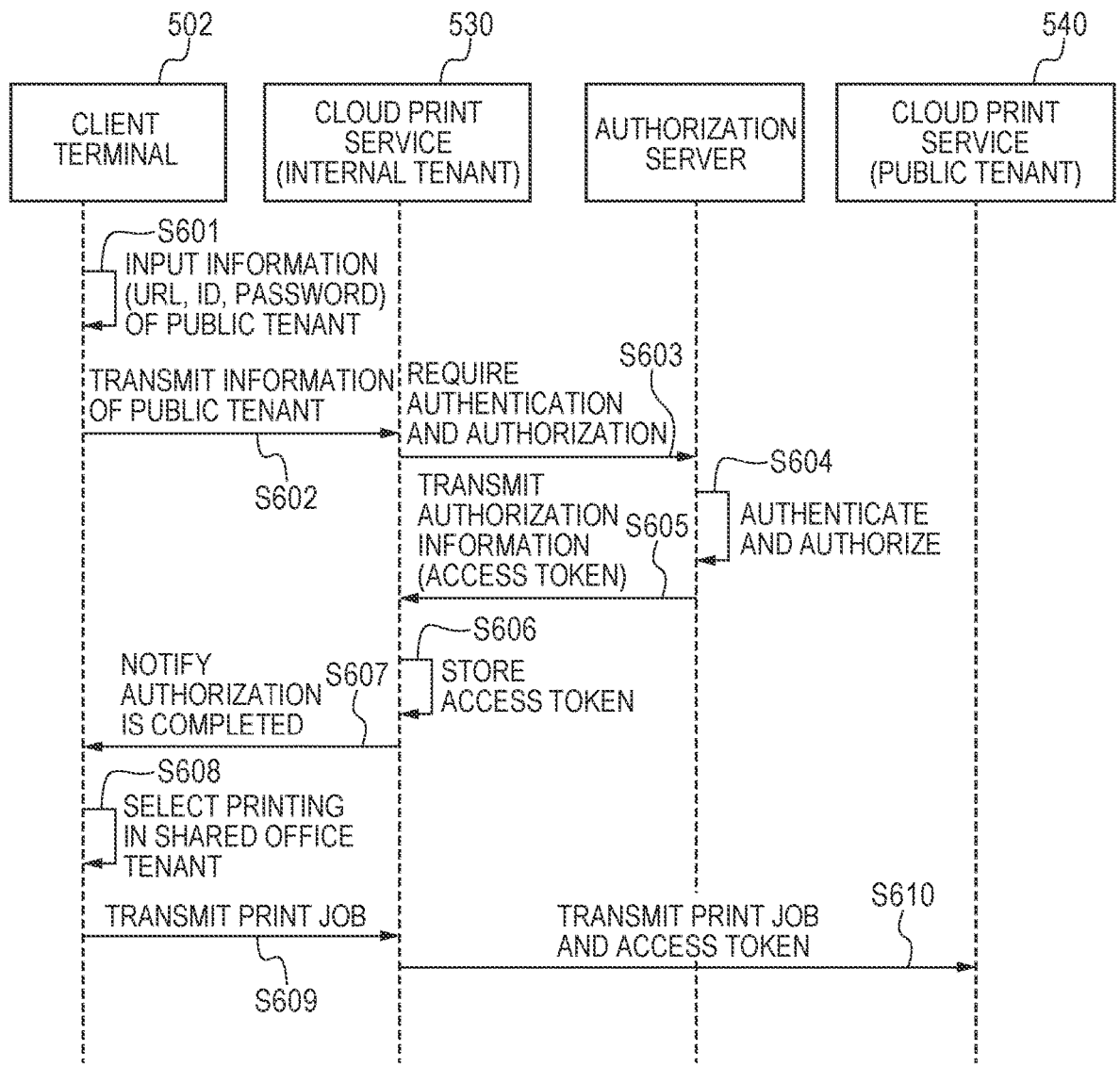
FIG. 6 illustrates an example of a sequence diagram of the authentication and authorization process from the internal tenant to the public tenant.
Figure 7:
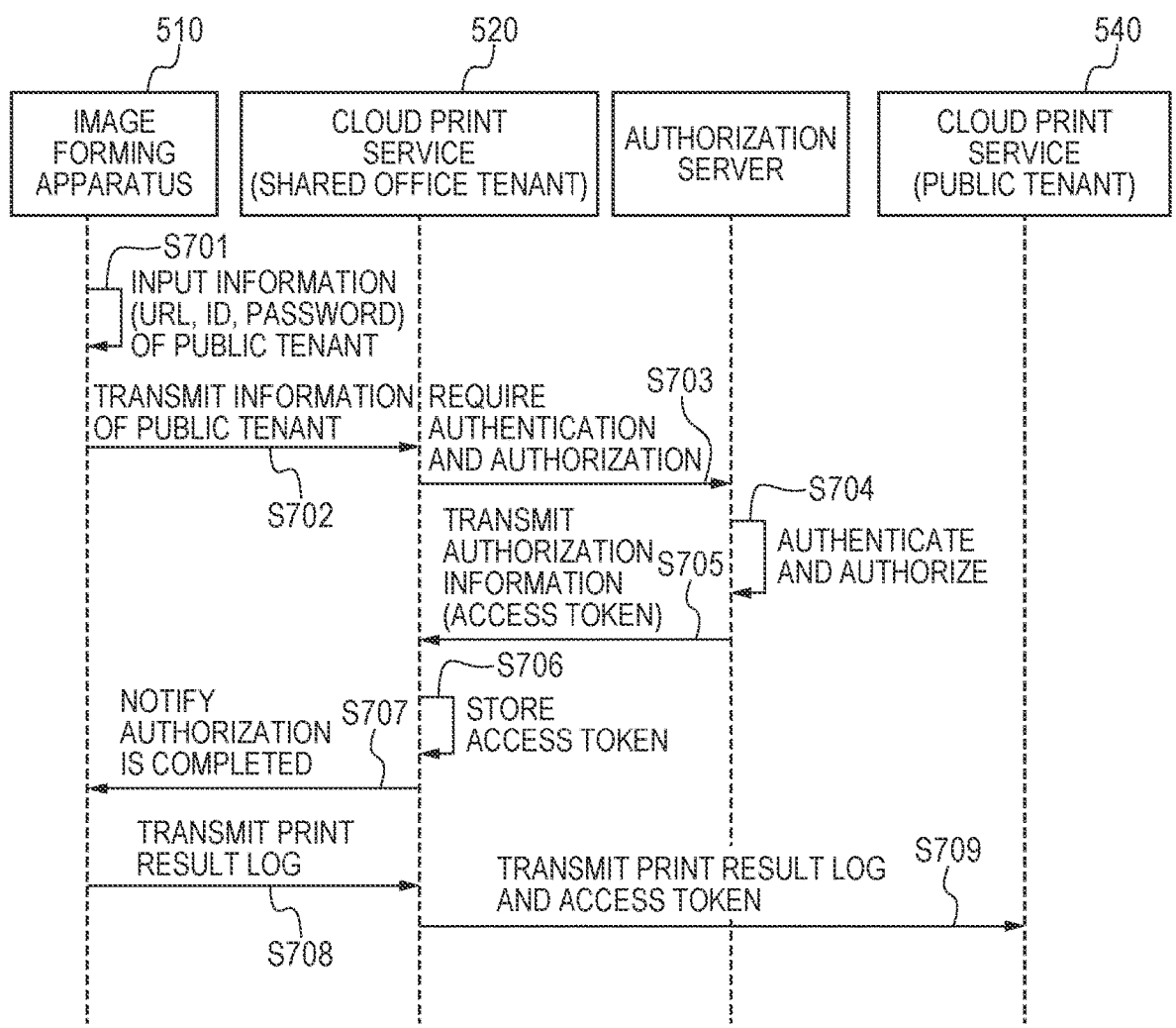
FIG. 7 illustrates an example of a sequence diagram of the authentication and authorization process from the shared office tenant to the public tenant.

FIGS. 6 and 7 illustrates the sequence of authentication and authorization processing in the system configuration of FIG. 5. It is assumed that the user has already issued user accounts for the internal tenants, the shared office tenants, and the public tenants, respectively.

Figure 9:
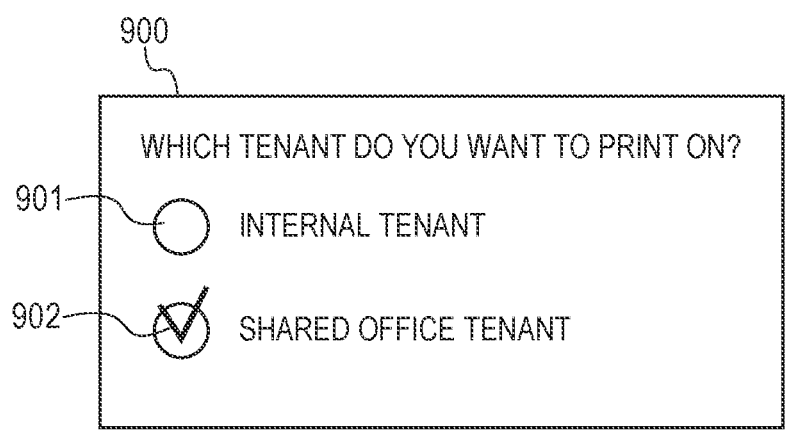
FIG. 9 illustrates an example of the UI for selecting the tenant performing the print execution.

FIG. 6 illustrates a sequence for transmitting the print job from the internal tenant to the public tenant using the authentication and authorization mechanism. First, the user inputs information of the public tenant (for example, the public tenant's URL, ID, and Password) by the client terminal 502 (S601) and transmits the information of the public tenant to the internal tenant (S602). The internal tenant transmits the received information to the authorization server (S603). The authorization server performs authentication and authorization processing based on the received information (S604). If authorization is successful, the authorization server transmits authorization information (access token) to the internal tenant (S605). The internal tenant stores the received access token (S606) and notifies the client terminal 502 that authorization is completed (S607). When the user designates the shared office tenant as the print job transmission destination in the client terminal 502 (S608), the print job is transmitted to the internal tenant (S609). A UI control unit 306 displays a tenant selection UI 900 as illustrated in FIG. 9, for example, via the display device 1057, and enables the user to specify the transmission destination of the print job by checking a internal tenant 901 or a shared office tenant 902 of the radio button.

The internal tenant receiving the print job transmits the print job to the public tenant together with the stored access token (S610). By using such the authentication and authorization mechanism, secure information called print jobs can be transmitted and received between external tenants.

FIG. 7 illustrates a sequence for transmitting print result logs from the shared office tenant to the public tenant using the authentication and authorization mechanism. First, the user inputs information of the public tenant (for example, the public tenant's URL, ID, and Password) by the client terminal 500 (S701) and transmits the information of the public tenant to the shared office tenant (S702). The shared office tenant transmits the received information to the authorization server (S703). The authorization server performs authentication and authorization processing based on the received information (S704). If the authorization is successful, the authorization server transmits authorization information (access token) to the shared office tenant (S705). The shared office tenant stores the received access token (S706) and notifies the image forming apparatus 510 that the authorization is completed (S707). The image forming apparatus 510 transmits the execution result information of the executed print job to the shared office tenant (S708). The shared office tenant receiving the print result log transmits the print result log to the public tenant together with the stored access token (S709). By using such the authentication and authorization mechanism, secure information called print jobs can be transmitted and received between external tenants.

The authorization server illustrated in FIG. 6 and the authorization server illustrated in FIG. 7 may be the same server or different servers.

Note that the sequence illustrated in FIG. 7 is applicable even when the shared office tenant acquires the print job from the public tenant. In this case, in step S708, the image forming apparatus 510 transmits information for identifying the print job to the shared office tenant. In step S709, the shared office tenant requests the public tenant to perform the print job relating to the information received from the image forming apparatus together with the stored access token, and acquires the print job from the public tenant.

[Flow of Acquiring Print Result Log]

Figure 8:
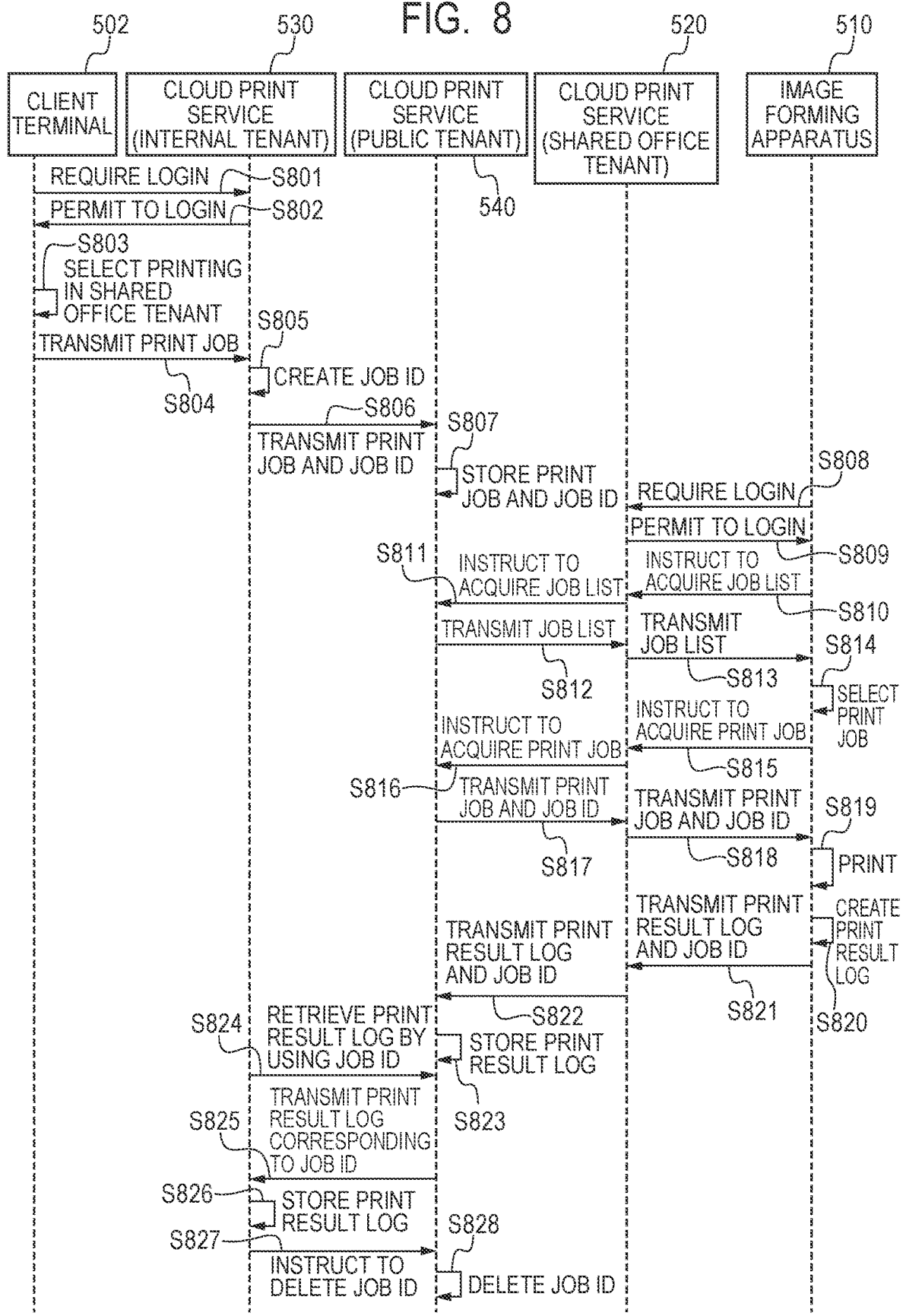
FIG. 8 illustrates an example of a sequence diagram of the print execution processing in the first embodiment.

FIG. 8 illustrates a flow from the time when the user prints the document stored in the client terminal 502 in the company by the image forming apparatus 510 in the shared office to the time when the print result log is acquired by the CPS 530 having the tenant in the company. As a prerequisite, users have been issued user accounts for internal tenants, shared office tenants, and public tenants.

In addition, the authorization has been completed according to the authorization sequence illustrated in FIGS. 6 and 7, and it is assumed that the internal tenant can transmit the print job to the public tenant and the shared office tenant can transmit the print result log to the public tenant.

First, the user inputs information for logging in to the internal tenant 530 at the client terminal 502, and logs in to the internal tenant 530 (S801 and S802). The user logs in to the tenant by transmitting the specified login information to the CPS 530 via the input device 1056. An authentication control unit 304 of the CPS 530 inquires about the login information to an authentication service (not shown) via a communication unit 303, and performs authentication. If the authentication is successful, the process proceeds to step S803. On the other hand, if the authentication is not successful, the process of step S801 is redone.

Next, the user selects a tenant for performing printing (S803). The UI control unit 306 displays the tenant selection UI 900 as illustrated in FIG. 9, for example, via the display device 1057, and checks the radio button to designate the internal tenant 901 or the shared office tenant 902 as the transmission destination of the print job.

In step S803, when the internal tenant 901 is selected, the print job is transmitted to the internal tenant 530 via the communication unit 303, and the job management unit 302 stores the print job in the data storage unit 305 to perform normal internal printing. When the shared office tenant 902 is selected, the client terminal 502 transmits the print job to the connected internal tenant 530 via the communication unit 303 (S804), and the process proceeds to step S805.

In step S805, the job management unit 302 of the internal tenant 530 creates and assigns a unique job ID for identifying the job, and stores the job ID in the data storage unit 305.

In step S806, the internal tenant 530 transmits the print job and the job ID created in step S805 to the public tenant 540 connected by the authentication and authorization process illustrated in FIG. 4 via the communication unit 303.

In step S807, the print job and the job ID received via the communication unit 303 are stored in the data storage unit 305. At this time, the print job and the job ID are stored in association with the account authenticated by the authentication and authorization process illustrated in FIG. 4.

Next, the user inputs information for logging in to the shared office tenant 520 by the image forming apparatus 510, and logs in to the shared office tenant (S808 and S809). The user logs in to the tenant by transmitting the specified login information to the CPS 520 via the input device 1006. The authentication control unit 304 of the CPS 520 inquires about the login information to an authentication service (not shown) via the communication unit 303, and performs authentication. If the authentication is successful, the process proceeds to step S810. On the other hand, if the authentication is not successful, the process of step S808 is redone.

In step S810, the image forming apparatus 510 transmits a job list acquisition instruction to the connected shared office tenant 520 via the communication unit 303.

In step S811, the shared office tenant 520 that has received the job list acquisition instruction from the image forming apparatus 510 transmits the job list acquisition instruction to the public tenant 540 via the communication unit 303.

In step S812, the public tenant 540 that has received the instruction to acquire the job list from the shared office tenant 520 creates a job list from the print job and the job ID stored in the data storage unit 305. The public tenant 540 transmits the created job list to the shared office tenant 520 via a communication unit 303. The job in the job list is job information such as a job ID, a document name included in the print job, and a print job input time.

In step S813, the shared office tenant 520 that has received the job list from the public tenant 540 transmits the job list to the image forming apparatus 510 via the communication unit 303.

In step S814, the image forming apparatus 510 displays job information (the job ID is not displayed) on the display device 1007 from the job list received from the shared office tenant 520, and the user selects the job via the input device 1006.

In step S815, the image forming apparatus 510 extracts the job ID of the job selected in step S814, transmits identification information such as the job ID to the shared office tenant 520 via the communication unit 303, and instructs the shared office tenant to acquire the job.

In step S816, the shared office tenant 520 transmits the job ID received from the image forming apparatus 510 to the public tenant 540 via the communication unit 303, and instructs the public tenant to acquire the job.

In step S817, the public tenant 540 searches for the job ID matching the job ID received from the shared office tenant 520 among the job IDs stored in the data storage unit 305. The public tenant 540 transmits the received job ID and the print job corresponding to the received job ID to the shared office tenant 520 via the communication unit 303.

In step S818, the shared office tenant 520 transmits the job ID and the print job received from the public tenant 540 to the image forming apparatus 510 via the communication unit 303.

In step S819, the image forming apparatus 510 prints the print job received from the shared office tenant 520 by the printer device 1009.

In step S820, the image forming apparatus 510 creates the print result log from the number of printed sheets, printing method, and charging information of the printing performed in step S819.

In step S821, the image forming apparatus 510 transmits the job ID received from the shared office tenant 520 and the print result log created in step S820 via the communication unit 303.

In step S822, the shared office tenant 520 transmits the job ID and the print result log received from the image forming apparatus 510 to the public tenant 540 via the communication unit 303.

In step S823, the public tenant 540 retrieves a job ID matching the job ID received from the shared office tenant 520 from the job IDs stored in the data storage unit 305. The public tenant 540 associates the print result log with the job ID and stores the print result log in a data storage unit 305, and deletes the print job associated with the job ID.

In step S824, the internal tenant 530 transmits the job ID stored in the data storage unit 305 to the public tenant 540 via the communication unit 303, and requests to retrieve the print result log using the job ID. The processing in step S824 is executed at a constant interval (for example, 1 hour) when the job ID is stored in the data storage unit 305. Further, in order to reduce the load on the public tenant 540 when there are many companies using the service and there are many internal tenants 530, it is also possible to limit the acquisition to the timing at which the display of the print result log is required, rather than the fixed interval. The timing when the display is required is, for example, when the client terminal 502 logs in to the internal tenant.

In step S825, the public tenant 540 retrieves the job ID matching the job ID received from the internal tenant 530 among the job IDs stored in the data storage unit 305. The public tenant 540 transmits the print result log in association with the matched job ID to the internal tenant 530 via the communication unit 303. When the transmitted print result log is empty, the public tenant 540 retrieves the job ID again at the next execution of step S824. On the other hand, when the print result log is not empty, the process proceeds to step S826.

In step S826, the internal tenant 530 stores the print result log received from the public print 540 in association with the job ID transmitted in step S824 in the data storage unit 305.

In step S827, the internal tenant 530 instructs the public tenant 540 via the communication unit 303 to delete the job ID of the job corresponding to the stored print result log.

In step S828, the public tenant deletes the job ID instructed to delete in step S827 among the job IDs stored in the data storage unit 305.

By performing the authentication and authorization processing illustrated in FIGS. 6 and 7, printing can be executed and the print result log can be acquired as illustrated in FIG. 8. Therefore, when the job is transmitted from the client terminal 502 to the cloud print service 530, it is not necessary to select the shared office tenant 520 for executing printing.

In this embodiment, a plurality of printing services (internal tenants and shared office tenants) cooperate by connecting to a public tenant. According to embodiments of the present disclosure, a plurality of print services can cooperate with each other by accessing one print service.

Second Embodiment

In the first embodiment, the user accounts of the internal tenant, the shared office tenant, and the public tenant are respectively described as having been issued. In the second embodiment, the user accounts of the shared office tenant and the public tenant have not been issued, and an example of a printing execution method and a printing result log acquisition method when authentication and authorization processing is performed using a system account (common to all users) will be described. It should be noted that all the configurations and processes not specifically described are the same as those of the first embodiment.

[Flow of Authentication and Authorization Processing]

FIGS. 6 and 7 illustrate a flow of authentication and authorization processing in the system configuration of FIG. 5. In the second embodiment, ID and password used in S601 and S701 are the ID and password of the system account, and the administrator performs the processing illustrated in FIGS. 6 and 7 when the system is installed.

[Flow of Acquiring Print Result Logs]

Figure 11:
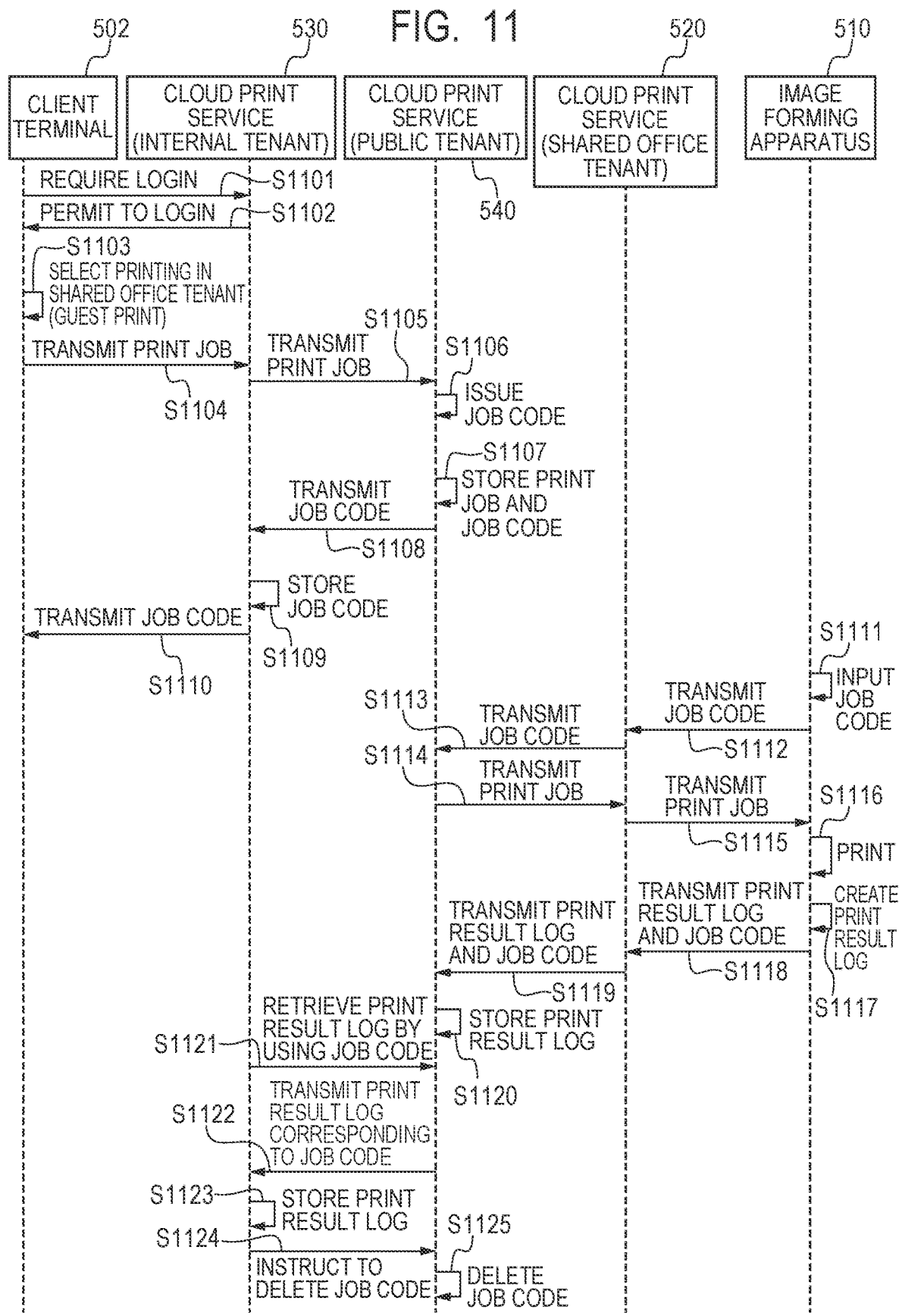
FIG. 11 illustrates an example of a sequence diagram of the print execution processing in the second embodiment.

FIG. 11 illustrates a flow from the time when the user prints a document in the client terminal 502 in a company by the image forming apparatus 510 in the shared office to the time when the print result log is acquired by the CPS 530 having a tenant in the company. As a prerequisite, the user has been issued the user account of the internal tenant, the system account of the shared office tenant, and the system account of the public tenant. The authorization from the image forming apparatus 510 to the shared office tenant 520 and the authorization sequence illustrated in FIGS. 6 and 7 shall be completed. That is, the internal tenant can transmit the print job to the public tenant, and the image forming apparatus can transmit the print result log to the public tenant via the shared office tenant.

First, the user inputs information for logging in to the internal tenant 530 at the client terminal 502, and logs in to the internal tenant 530 (S1101 and S1102). The client terminal 502 transmits the specified login information to the CPS 530 via the input device 1056. The authentication control unit 304 of the CPS 530 inquires about the login information to an authentication service (not shown) via the communication unit 303, and performs authentication. If the authentication is successful, the process proceeds to step S1103. On the other hand, if the authentication is not successful, the process of step S1101 is redone.

Next, the user selects a tenant for performing printing (step S1103). The UI control unit 306 displays the tenant selection UI 900 as illustrated in FIG. 9, for example, via the display device 1057, and checks the radio button to designate the internal tenant 901 or the shared office tenant 902 as the transmission destination of the print job.

In step S1103, when the internal tenant 901 is selected, the print job is transmitted to the internal tenant 530 via the communication unit 303, and the job management unit 302 stores the print job in the data storage unit 305 to perform normal internal printing. When the shared office tenant 902 is selected, the client terminal 502 transmits the print job to the internal tenant 530 connected to the client terminal 502 via the communication unit 303 (step S1104), and the process proceeds to the step S1105.

In step S1105, the internal tenant 530 transmits the print job to the public tenant 540 connected by the authentication and authorization process illustrated in FIG. 4 via the communication unit 303.

In step S1106, the job management unit 302 of the public tenant 540 creates a unique job code for identifying the job.

In step S1107, the job management unit 302 of the public tenant 540 stores the job code created in step S1106 and the print job received in step S1105 in the data storage unit 305.

In step S1108, the public tenant 540 transmits the job code created in step S1106 to the internal tenant 530 via the communication unit 303.

In step S1109, the internal tenant 530 stores the job code received in step S1108 in the data storage unit 305.

In step S1110, the internal tenant 530 transmits the job code received in step S1108 to the client terminal 502 via the communication unit 303. The client terminal 502 displays the received job code on a display device 1107.

In step S1111, the image forming apparatus 510 receives the job code input via the input device 1006. The user operates the input device 1006 of the image forming apparatus 510 to input the job code displayed in step S1110.

In step S1112, the image forming apparatus 510 transmits the job code input in step S1111 to the shared office tenant 520 via the communication unit 303.

In step S1113, the shared office tenant 520 transmits the job code received in step S1112 to the public tenant 540 via the communication unit 303.

In step S1114, the public tenant 540 retrieves whether the job code received in step S1113 exists among the job codes stored in the data storage unit 305. When the job code exists, the print job in association with the job code is transmitted to the shared office tenant 520 via the communication unit 303. On the other hand, when the job code does not exist, an empty job is transmitted to the shared office tenant 520.

In step S1115, the shared office tenant 520 transmits the print job received in step S1114 to the image forming apparatus 510 via the communication unit 303.

In step S1116, the image forming apparatus 510 prints the print job received from the shared office tenant 520 by the printer device 1009. When the print job received in step S1115 is empty, a screen (not shown) prompting re-input of the job code is displayed via the display device 1007, and the process returns to step S1111.

In step S1117, the image forming apparatus 510 creates the print result log from the number of printed sheets, printing method, and charging information of the printing performed in step S1116.

In step S1118, the image forming apparatus 510 transmits the job code input in step S1111 and the print result log created in step S1117 via the communication unit 303.

In step S1119, the shared office tenant 520 transmits the job code and the print result log received from the image forming apparatus 510 to the public tenant 540 via the communication unit 303.

In step S1120, the public tenant 540 retrieves the job code matching the job ID received from the shared office tenant 520 among the job codes stored in the data storage unit 305. The public tenant 540 associates the print result log with the matched job code and stores the print result log in the data storage unit 305, and deletes the print job in association with the job code.

In step S1121, the internal tenant 530 transmits the job code stored in the data storage unit 305 to the public tenant 540 via the communication unit 303 and requests to retrieve the print result log using the job code. The processing of the step S1121 is executed at a constant interval (for example, 1 hour) when the job code is stored in the data storage unit 305. Further, in order to reduce the load on the public tenant 540 when many companies use the service and there are many internal tenants 530, it is also possible to limit the acquisition of the print result log to a timing when the display of the print result log is required, rather than the constant interval. The timing when the display is required is, for example, when the client terminal 502 logs in to the internal tenant.

In step S1122, the public tenant 540 retrieves the job code matching the job code received from the internal tenant 530 among the job codes stored in the data storage unit 305. The public tenant 540 transmits the print result log in association with the matched job code to the internal tenant 530 via the communication unit 303. When the transmitted print result log is empty, the retrieval is performed again at the next execution of step S1121. On the other hand, when the print result log is not empty, the process proceeds to step S1123.

In step S1123, the internal tenant 530 stores the print result log received from the public tenant 540 in association with the job code transmitted in step S1121 in the data storage unit 305.

In step S1124, the internal tenant 530 instructs the public tenant 540 via the communication unit 303 to delete the job code of the job corresponding to the print result log.

In step S1125, the public tenant 540 deletes the job code instructed to delete in step S1124 among the job codes stored in the data storage unit 305.

Even when the authentication and authorization processing in FIGS. 5 and 6 is performed by the system account rather than the user account, printing can be executed and the print result log can be acquired as illustrated in FIG. 11. Therefore, when the job is transmitted from the client terminal 502 to the cloud print service 530, it is not necessary to select the shared office tenant 520 for executing printing.

In this embodiment, data is transmitted and received between the CPS s using the job code issued by the public tenant. Thus, even when user accounts of the shared office tenant and the public tenant are not issued, the plurality of print services can cooperate with each other by accessing one print service.

According to embodiments of the present disclosure, the plurality of print services can cooperate with each other by accessing one print service.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)'), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-067956, filed Apr. 13, 2021, which is hereby incorporated by reference herein in its entirety.

What is claimed is:

1. A system including a first print service connected to a client terminal via a network, a second print service connected to an image forming apparatus via the network, and a third print service communicable with the first print service and the second print service,
wherein the first print service comprises first one or more memories storing first instructions and first one or more processors that execute the first instructions to:
store first authorization information for accessing the third print service in the first one or more memories;
receive a print job from the client terminal; and
access the third print service based on the stored first authorization information to transmit the received print job to the third print service,
wherein the second print service comprises second one or more memories storing second instructions and second one or more processors that execute the second instructions to:
store second authorization information for accessing the third print service in the second one or more memories;
receive, from the image forming apparatus, identification information for identifying the print job;
access the third print service based on the stored second authorization information to transmit the received identification information to the third print service and acquire the print job corresponding to the identification information from the third print service; and
transmit the acquired print job to the image forming apparatus, and
wherein the third print service comprises third one or more memories storing third instructions and third one or more processors that execute the third instructions to:
receive the print job transmitted from the first print service;
store the received print job associated with the identification information in the third one or more memories; and
transmit the stored print job corresponding to the identification information to the second print service in a case where the third print service receives the identification information from the second print service.

2. The system according to claim 1,
wherein the second one or more processors further execute the second instructions to receive result information of the print job from the image forming apparatus and transmit the received result information of the print job to the third print service,
wherein the third one or more processors further execute the third instructions to store the result information received from the second print service in the third one or more memories, and
wherein the first one or more processors further execute the first instructions to receive the result information from the third print service.

3. The system according to claim 2, wherein the first one or more processors further execute the first instructions to:
store the identification information for identifying the print job in the first one or more memories; and
transmit the stored identification information to the third print service for receiving the result information corresponding to the transmitted identification information from the third print service.

4. The system according to claim 3, wherein the stored identification information stored in the first one or more memories is a job ID given by the first print service or a job code issued by the third print service.

5. The system according to claim 1,
wherein the first print service and the second print service are communicable with an authorization server,
wherein the first authorization information is issued by the authorization server, and
wherein the second authorization information is issued by the authorization server.

6. A control method for controlling a system including a first print service connected to a client terminal via a network, a second print service connected to an image forming apparatus via the network, and a third print service communicable with the first print service and the second print service, the control method comprising:
storing, by the first print service, first authorization information for accessing the third print service;
receiving, by the first print service, a print job from the client terminal;
transmitting, by the first print service, the received print job to the third print service by accessing the third print service based on the stored first authorization information;
receiving, by the third print service, the print job from the first print service;
storing, by the third print service, the print job received from the first print service, wherein the stored print job is associated with identification information for identifying the print job;
storing, by the second print service, second authorization information for accessing the third print service;
receiving, by the second print service, the identification information from the image forming apparatus;
transmitting, by the second print service, the received identification information to the third print service by accessing the third print service based on the stored second authorization information;
receiving, by the third print service, the identification information from the second print service;
transmitting, by the third print service, the stored print job corresponding to the received identification information to the second print service;
acquiring, by the second print service, the transmitted print job corresponding to the identification information from the third print service; and
transmitting, by the second print service, the acquired print job to the image forming apparatus.

* * * * *